United States Patent
Matsui et al.

(10) Patent No.: US 8,743,322 B2
(45) Date of Patent: Jun. 3, 2014

(54) LIQUID CRYSTAL DISPLAY DEVICE

(75) Inventors: Kohei Matsui, Tokyo (JP); Kaoru Hatta, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 312 days.

(21) Appl. No.: 13/138,931

(22) PCT Filed: Apr. 28, 2010

(86) PCT No.: PCT/JP2010/003074
§ 371 (c)(1),
(2), (4) Date: Oct. 26, 2011

(87) PCT Pub. No.: WO2010/125824
PCT Pub. Date: Nov. 4, 2010

(65) Prior Publication Data
US 2012/0038864 A1    Feb. 16, 2012

(30) Foreign Application Priority Data
Apr. 30, 2009  (JP) .................................. 2009-110488

(51) Int. Cl.
*G02F 1/1335* (2006.01)

(52) U.S. Cl.
USPC ........................................ 349/106; 349/110

(58) Field of Classification Search
USPC ................................. 349/106–111
See application file for complete search history.

(56) References Cited

U.S. PATENT DOCUMENTS

| | | |
|---|---|---|
| 5,870,157 A | 2/1999 | Shimada et al. |
| 6,924,857 B2 * | 8/2005 | Wachi ........................... 349/106 |
| 7,202,924 B1 | 4/2007 | Park et al. |
| 7,327,419 B2 * | 2/2008 | Kocha et al. ................... 349/106 |
| 7,359,014 B2 * | 4/2008 | Choi et al. ..................... 349/106 |
| 7,522,235 B2 * | 4/2009 | Roh ............................... 349/109 |
| 8,605,237 B2 * | 12/2013 | Matsui et al. .................. 349/106 |

(Continued)

FOREIGN PATENT DOCUMENTS

| JP | 7-244213 | 9/1995 |
|---|---|---|
| JP | 9-152593 | 6/1997 |

(Continued)

OTHER PUBLICATIONS

International Search Report for PCT/JP2010/003074 mailed Jun. 15, 2010, (partially translation).

(Continued)

*Primary Examiner* — Dung Nguyen (57) ABSTRACT

A liquid crystal display device is provided which prevents variation in display from being caused due to misalignment of positions of exposure heads and/or error in assembly, and which is excellent in display quality. A liquid crystal display device 1 includes: a color filter 2 and a TFT substrate 3 which are bonded so as to oppose each other; and liquid crystal (not shown) sealed in a space formed therebetween. The color filter 2 includes: a substrate 4; black matrixes 5 provided on the substrate 4; and a plurality of colored layers 6 and 7 which partially overlap the black matrixes 5 at each pixel position. Vertices of ridges 18a and 28a formed by the colored layers 6 and 7 overlapping the black matrix 5 are positioned in an area where upper edges 19a and 29a, respectively, which continue in the Y-axis direction, are shielded from light by a light shielding section 10a of the TFT substrate 3.

6 Claims, 8 Drawing Sheets

(56) References Cited

U.S. PATENT DOCUMENTS

| | | |
|---|---|---|
| 2004/0021816 A1 | 2/2004 | Jeong et al. |
| 2006/0114386 A1 | 6/2006 | Choi |
| 2007/0020439 A1 | 1/2007 | Yamamoto |
| 2009/0257009 A1 | 10/2009 | Hirato |
| 2009/0283767 A1 | 11/2009 | Nakagawa |

FOREIGN PATENT DOCUMENTS

| | | |
|---|---|---|
| JP | 2000-305114 | 11/2000 |
| JP | 2004-70315 | 3/2004 |
| JP | 2006-154736 | 6/2006 |
| JP | 2006-337804 | 12/2006 |
| JP | 2007-121344 | 5/2007 |
| JP | 2008-216593 | 9/2008 |
| WO | WO 2007/113941 | 10/2007 |
| WO | WO 2008/047497 | 4/2008 |

OTHER PUBLICATIONS

Chinese Office Action mailed Dec. 4, 2013 in corresponding Chinese Application No. 201080019031.1.
Partial Machine English Translation of JP 7-244213 (Ref. AJ on the IDS filed Oct. 26, 2011).

* cited by examiner

LIQUID CRYSTAL DISPLAY DEVICE

CROSS-REFERENCE TO RELATED APPLICATIONS

This application claims the benefit under 35 U.S.C. Section 371, of PCT International Application No. PCT/JP2010/003074, filed Apr. 28, 2010, which claimed priority to Japanese Application No. 2009-110488, filed Apr. 30, 2009 in the Japanese Patent Office, the disclosures of which are hereby incorporated by reference.

BACKGROUND

1. Field

The present invention relates to liquid crystal display devices each having liquid crystal sealed between a color filter and a thin film transistor (TFT) substrate.

2. Description of Related Art

A color filter for use in a liquid crystal display device includes, on a substrate, colored layers of three colors, that is, red, green, and blue, and black matrixes, and the colored layers form pixels, and the black matrixes are provided between each pixel for blocking light. A TFT substrate having a plurality of thin film transistors (including pixel electrodes, switching elements formed of a semiconductor, and insulating film layers), and a source wiring and a gate wiring, is provided so as to oppose the color filter. Liquid crystal is sealed between the color filter and the TFT substrate.

In a process of producing the color filter, patterning is performed in a photolithography method to form the colored layers and the black matrixes. At this time, an exposure method (hereinafter, referred to as a "small mask continuous exposure method") using a plurality of small photomasks may be used.

Figure 6:
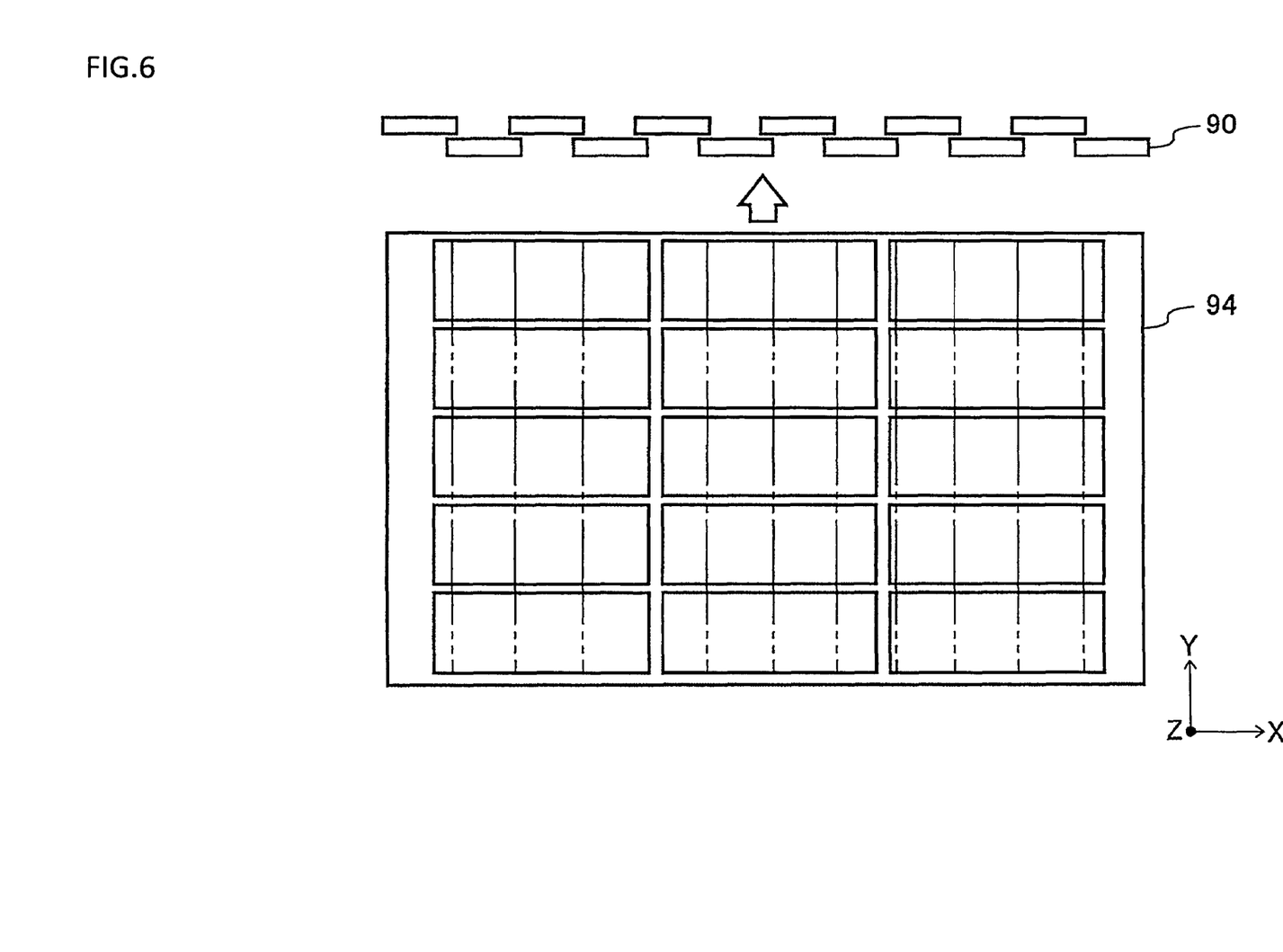
FIG. 6 is a schematic diagram illustrating an exposure method used in a process for producing a color filter.

FIG. 6 is a schematic diagram illustrating an exposure method used in the process of producing a color filter, and illustrating the small mask continuous exposure method.

In an exposure device for use in the small mask exposure method, a plurality of exposure heads 90 each having a mask smaller than a substrate 94 are positioned so as to be aligned in a plurality of rows. The exposure heads 90 in a row are positioned between adjacent exposure heads 90 in another row without space such that pitches between the mask patterns formed on each photomask become uniform.

An exposure process is repeated multiple times, while the substrate 94 having the photoresist applied thereto is being conveyed in the Y-axis positive direction (the direction indicated by an arrow in the drawings) relative to the plurality of exposure heads 90 aligned as described above, so that pattern can be formed over the entire surface of the substrate 94 through baking

CITATIONS

Japanese Laid-Open Patent Publication No. 2007-121344
Japanese Laid-Open Patent Publication No. 2008-216593

SUMMARY

Problems Addressed by Embodiments of the Invention

In a case where colored patterns are formed on the color filter by using the small mask continuous exposure method as described above, a problem arises that variations of the formed colored patterns occur, due to misalignment of the exposure heads 90 including joining portions thereamong, in portions (near portions indicated by the alternate long and two short dashes lines in FIG. 6. Hereinafter, these portions may be also referred to as "joining portions") which are exposed to light in the joining portions of the exposure heads 90

Figure 7:
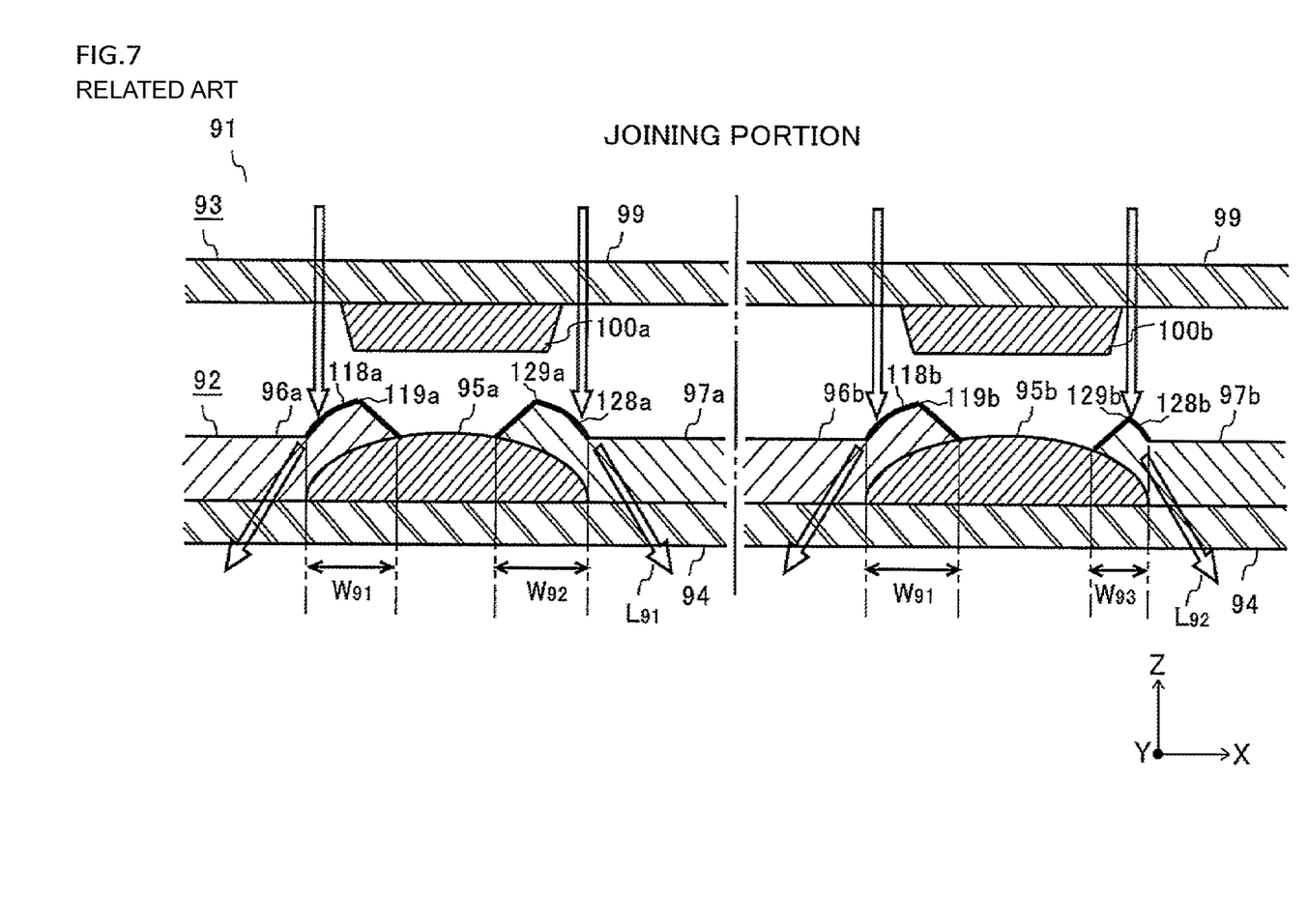
FIG. 7 is a cross-sectional view of an exemplary schematic structure of a conventional liquid crystal display device.

FIG. 7 is a cross-sectional view of an exemplary schematic structure of a conventional liquid crystal display device. The alternate long and two short dashes line in FIG. 7 corresponds to any one of the alternate long and two short dashes lines indicated in FIG. 6, and represents a position of the joining portion on the substrate. A portion of the color filter indicated to the left of the alternate long and two short dashes line, and a portion of the color filter indicated to the right of the alternate long and two short dashes line are exposed to light by different exposure heads, respectively.

A conventional liquid crystal display device 91 includes a color filter 92 and a TFT substrate 93 which are positioned so as to oppose each other. On a substrate 94 of the color filter 92, black matrixes 95a and 95b, and colored layers 96a, 96b, 97a, and 97b are formed. On a substrate 99 forming the TFT substrate 93, light shielding sections 100a and 100b are formed so as to oppose the black matrixes 95a and 95b, respectively. The light shielding sections 100a and 100b are each a region in which metal wiring connected to the thin film transistor provided on the TFT substrate 93 is formed.

In pixel areas to the left of the joining portion (the alternate long and two short dashes line), the colored layers 96a and 97a formed on pixel positions, respectively, on the substrate 94 partially overlap the black matrix 95a. Since the colored layer 96a overlaps the black matrix 95a, a ridge 118a (the thick line portion in the drawings) having an upper edge 119a as a vertex is formed, and since the colored layer 97a overlaps the black matrix 95a, a ridge 128a having an upper edge 129a as a vertex is formed. It is to be noted that each of the upper edges 119a and 129a continues linearly in the Y-axis direction. Further, an overlap width of an overlap portion in which the colored layer 96a overlaps the black matrix 95a is represented as $W_{91}$, and an overlap width of an overlap portion in which the colored layer 97a overlaps the black matrix 95a is represented as $W_{92}$.

Next, also in pixel areas to the right of the joining portion (the alternate long and two short dashes line), the colored layers 96b and 97b formed on pixel positions, respectively, on the substrate 94 partially overlap the black matrix 95b. Similarly, since the colored layer 96b overlaps the black matrix 95b, a ridge 118b having an upper edge 119b as a vertex is formed, and since the colored layer 97b overlaps the black matrix 95b, a ridge 128b having an upper edge 129b as a vertex is formed. An overlap width of an overlap portion in which the colored layer 96b overlaps the black matrix 95b is represented as $W_{91}$, which is the same as the overlap width in the pixel areas to the left of the joining portion. However, in a case where misalignment of positions of the exposure heads occurs when the colored layer 97b is exposed to light, an overlap width of an overlap portion in which the colored layer 97b overlaps the black matrix 95b is represented as $W_{93}$ ($<W_{92}$). Further, the upper edge 129b is located outside an area which is shielded from light by the light shielding section 100b.

In a case where the overlap width of the overlap portion in which the colored layer overlaps the black matrix is different between in the area to the left of the joining portion and in the area to the right of the joining portion, light $L_{91}$ transmitted through the area to the left of the joining portion and light $L_{92}$ transmitted through the area to the right of the joining portion are outputted in different manners. Further, in a case where the upper edge 129b is located outside an area which is shielded from light by the light shielding section, the light $L_{92}$ is transmitted through the upper edge 129b. As a result, a difference in output manner between the light $L_{91}$ transmitted through the area to the left of the joining portion and the light $L_{92}$ transmitted through the area to the right of the joining portion is increased. The difference in output of the light between in the area to the left of the joining portion and in the area to the right of the joining portion causes variations in image display in the liquid crystal display device.

Further, the liquid crystal display device using the color filter having the structure shown in FIG. 7 has the following problems.

Figure 8:
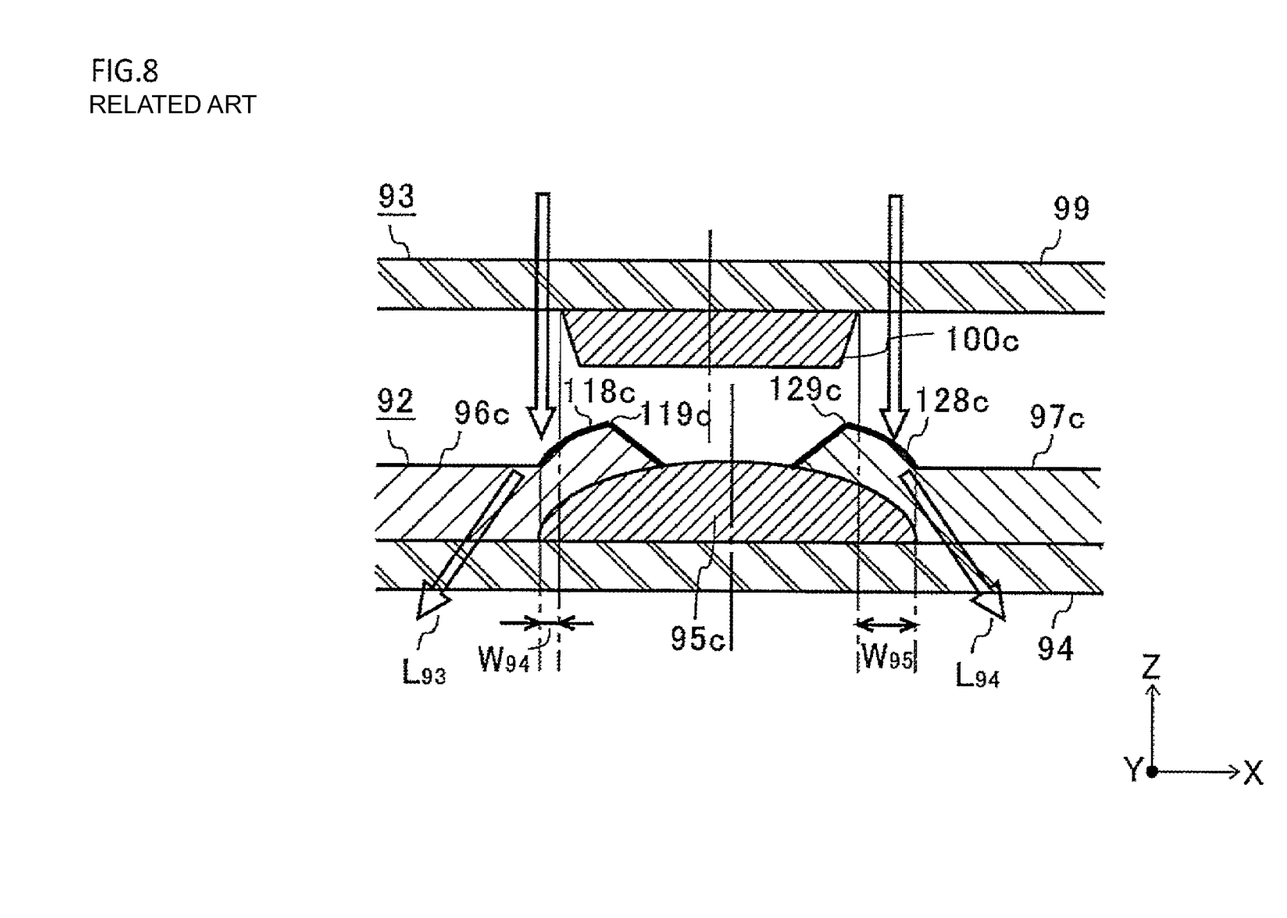
FIG. 8 is a cross-sectional view of another exemplary schematic structure of a conventional liquid crystal display device.

FIG. 8 is a cross-sectional view of another exemplary schematic structure of a conventional liquid crystal display device.

When the liquid crystal display device is assembled, the substrates are bonded to each other such that the center line of a light shielding section 100c on the TFT substrate 93 are aligned with the center line of a black matrix 95c. However, as shown in FIG. 8, error in assembly may cause misalignment of the central lines of both of them. In this case, even if an overlap width of an overlap portion in which a colored layer 96c overlaps the black matrix 95c, and an overlap width of an overlap portion in which a colored layer 97c overlaps the black matrix 95c, are almost the same, a protrusion width $W_{94}$ and a protrusion width $W_{95}$ by which protrusions from the light shielding section 100c occur are different from each other. In this case, an output manner of light $L_{93}$ and an output manner of light $L_{94}$ on both sides, respectively, of the black matrix are significantly different from each other, resulting in variation in image display. Further, in a case where error in assembly is further increased, it is assumed that an upper edge 119c or 129c may protrude so as to be outside an area which is shielded from light by the light shielding section. In an upper edge portion which protrudes so as to be outside the light-shielded area, variation of light transmission characteristic is significantly increased as compared to in the other portions, thereby leading to increase of variation in display.

Therefore, an object of the present invention is to make available a liquid crystal display device which can prevent variation in display from being caused due to misalignment of positions of exposure heads and/or error in assembly, and which is excellent in display quality.

Solutions to the Problems

The present invention is directed to a liquid crystal display device having a plurality of pixels aligned in a first direction and a second direction orthogonal to the first direction. The liquid crystal display device includes: a color filter having formed on a substrate light shielding layers, and a plurality of colored layers which partially overlap the light shielding layers in at least the first direction; a TFT substrate having a plurality of light shielding sections which extend in the second direction at such positions as to oppose the light shielding layers; and liquid crystal sealed between the color filter and the TFT substrate. Ridges extending in the second direction are formed by the plurality of colored layers overlapping the light shielding layers in the first direction. At least upper edges of the ridges are shielded from light by the plurality of light shielding sections.

Advantageous Effects of Embodiments

According to the present invention, a liquid crystal display device can be realized in which the upper edges of the ridges formed by the colored layers overlapping the black matrixes are positioned behind wiring and are shielded from light, and thus no variation in light emission is caused due to the upper edges of the ridges even when misalignment of positions of the overlap portions is caused due to photomasks being misaligned in position during exposure, and/or due to error in assembly, and in which display quality is excellent.

DESCRIPTION OF EMBODIMENTS

First Embodiment

Figure 1:
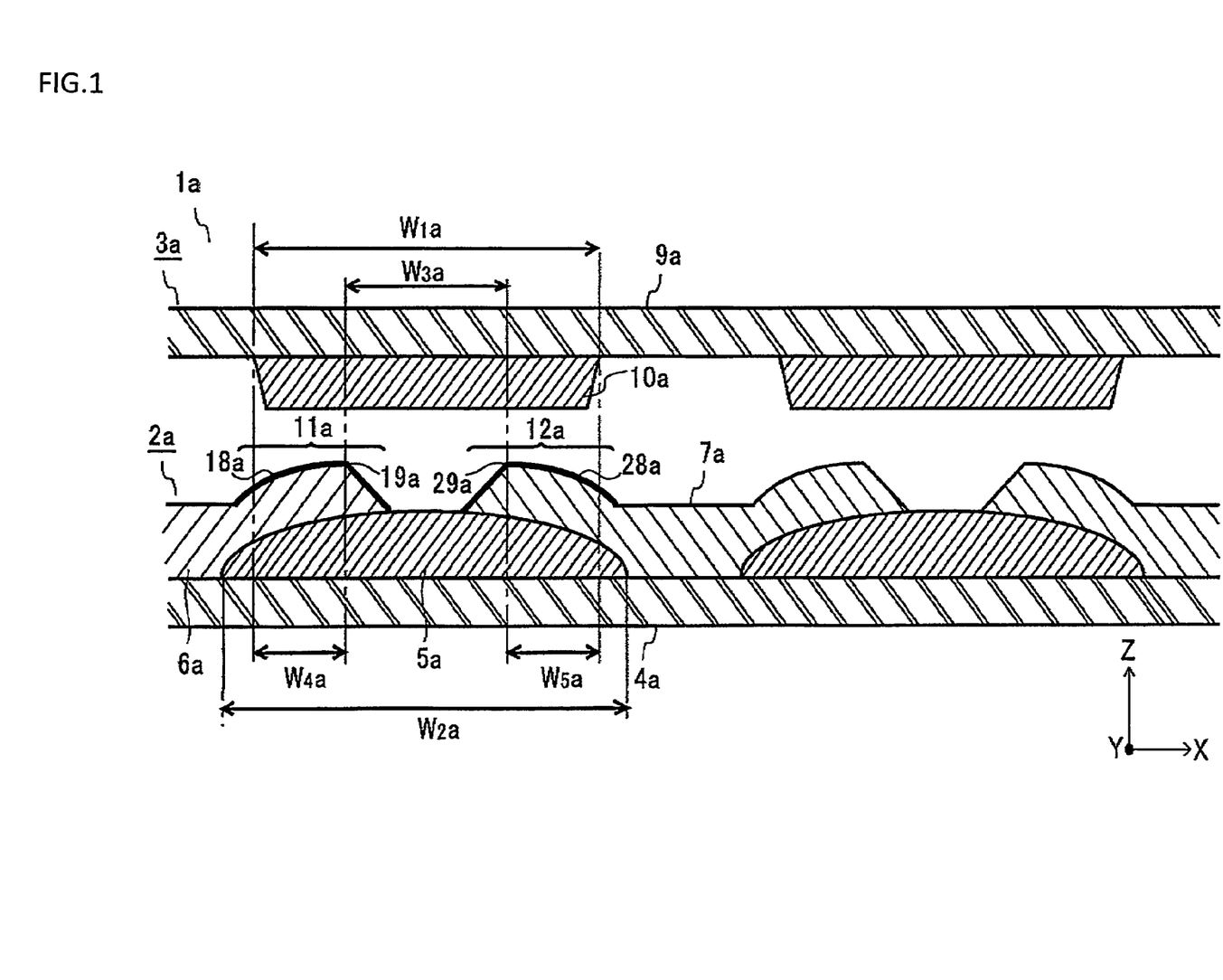
FIG. 1 is a cross-sectional view of a schematic structure of a liquid crystal display device according to a first embodiment.
Figure 2:
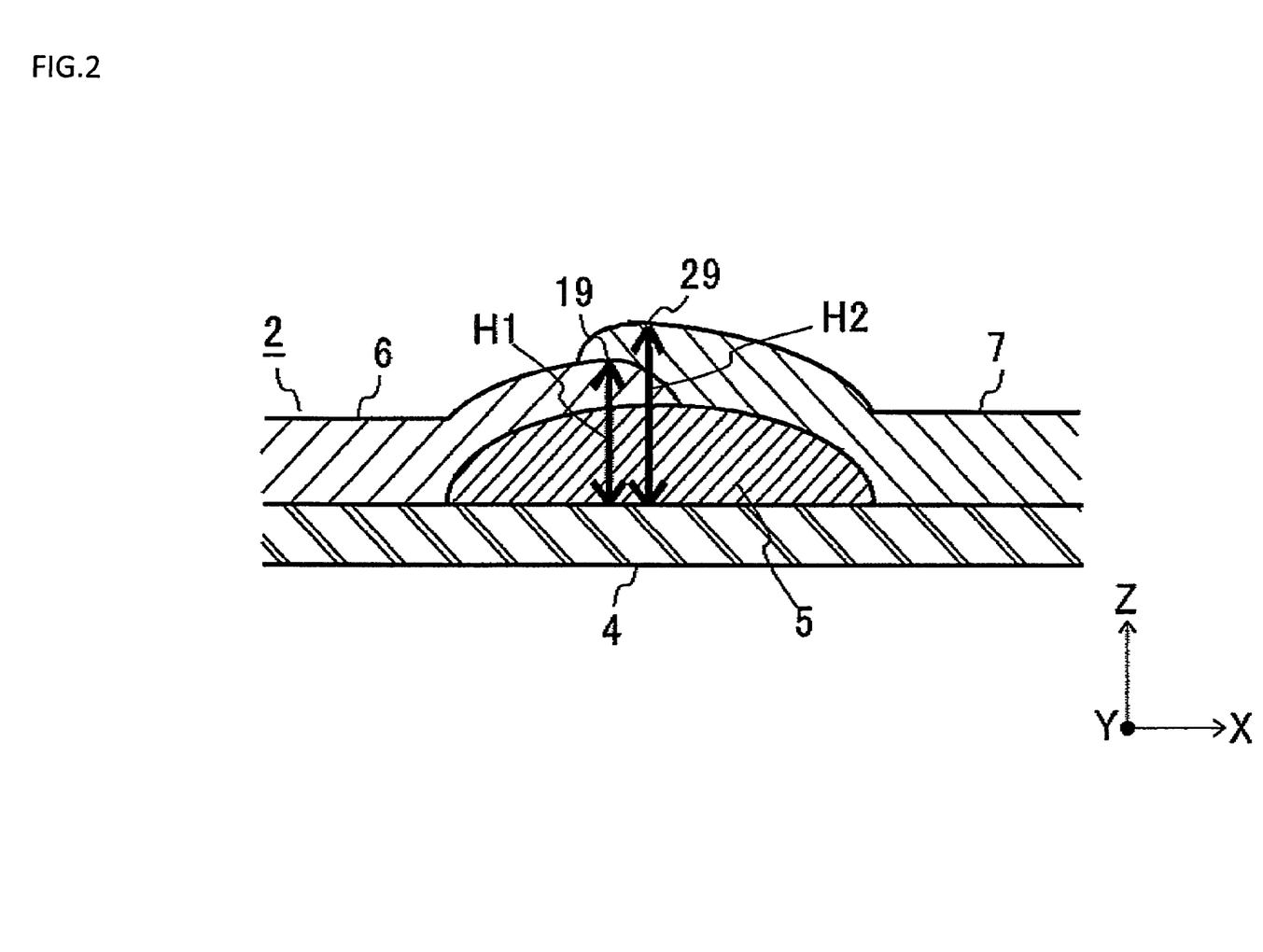
FIG. 2 is a cross-sectional view illustrating positions of upper edges of ridges in another exemplary case.

FIG. 1 is a cross-sectional view of a schematic structure of a liquid crystal display device according to a first embodiment of the present invention. FIG. 2 is a cross-sectional view illustrating positions of upper edges of ridges in another exemplary case.

A liquid crystal display device 1a according to the first embodiment has a plurality of pixels aligned in the X-axis direction and the Y-axis direction, and includes: a color filter 2a and a TFT substrate 3a which are bonded so as to oppose each other; and liquid crystal (not shown) sealed in a space formed between the color filter 2a and the TFT substrate 3a. A not-illustrated light source is positioned above the outer surface (the upper portion in FIG. 1) of the TFT substrate 3a.

The color filter 2a includes: a substrate 4a; black matrixes 5a provided on the substrate 4a; and a plurality of colored layers 6a and 7a formed on pixel positions, respectively. The colored layers 6a and 7a form overlap portions 11a and 12a, respectively, in which the respective colored layers partially overlap the black matrix 5a in the X-axis direction. Further, since the colored layers 6a and 7a overlap the black matrix 5a, the colored layers are raised to form ridges 18a and 28a, respectively (thick line portions in the drawings). The vertices of the ridges 18a and 28a each continue in the Y-axis direction, to form linear upper edges 19a and 29a, respectively.

Photoresist coated on the substrate 4a is patterned by using the photolithography method, thereby forming the colored layers 6a and 7a. Pixels of a first color (for example, red) and pixels of a second color (for example, green) can be formed by the small mask continuous exposure method (FIG. 6) using a plurality of small photomasks, and pixels of a third color (for example, blue) can be formed by using a proximity exposure method. Specifically, as described with reference to FIG. 6, by using the small mask exposure method, while the substrate 4a is being conveyed in the Y-axis direction, the opening pattern of the photomask provided in each exposure head is sequentially transferred by using a light source which is constantly lit up. As a result, the colored layers of the first color and the second color are formed into stripes extending in the Y-axis direction. It is to be noted that the opening pattern of the photomask may be intermittently transferred by using a blinking light source, to form dotted colored layers. Thereafter, for example, the entirety of the colored layers of the third color is formed at one time by using the proximity exposure method in which a single photomask is used. It is to be noted that colored layers of a fourth color (for example, yellow), in addition to red, blue, and green as described above, may be formed.

As shown in FIG. 2, the colored layer 6 and the colored layer 7 are likely to partially overlap each other on the black matrix 5 in the X-axis direction. Also in this case, the upper edge of each colored layer needs to be shielded from light by a light shielding section. Thus, also when the colored layer 6 and the colored layer 7 partially overlap each other, a position at which the distance from the substrate 4 to the surface of the colored layer 6 is maximum (H1) is defined as the upper edge 19, and a position at which the distance from the substrate 4 to the surface of the colored layer 7 is maximum (H2) is defined as the upper edge 29, as in a case shown in FIG. 1.

The TFT substrate 3a includes a plurality of thin film transistors (not shown), and a plurality of light shielding sections 10a extending in the Y-axis direction. The light shielding sections 10a are each a region in which metal wiring (source wiring, gate wiring, or both of them) connected to the thin film transistors is formed.

In the first embodiment, since a width $W_1a$ of the light shielding section 10a on the TFT substrate 3a is narrower than a width $W_2a$ of each black matrix, the overlap portions 11a and 12a on the color filter 2a each include a portion which is not shielded from light by the light shielding section 10a. However, the upper edges 19a and 29a are shielded from light by the light shielding section 10a. More specifically, the upper edges 19a and 29a are positioned between lines obtained by projecting, on the substrate 4a, the edges of the light shielding section 10a in the X-axis direction. A difference $(W_1a-W_3a)$ occurs between the width $W_1a$ of the light shielding section 10a, and a distance $W_3a$ between the upper edges 19a and 29a. Therefore, a distance $W_4a$ is formed between the upper edge 19a and the line obtained by projecting, on the substrate 4a, a corresponding one of the edges of the light shielding section 10a in the X-axis direction, and a distance $W_5a$ is formed between the upper edge 29a and the line obtained by projecting, on the substrate 4a, the other of the edges of the light shielding section 10a in the X-axis direction.

Also in the liquid crystal display device 1a having the structure described above, misalignment of positions in the colored layers may occur due to, for example, low accuracy for aligning each exposure head with the substrate. Specifically, a position at which the colored layer in a first area which is exposed to light by using a certain exposure head is formed, and a position at which the colored layer in a second area (area which is exposed to light by using another exposure head) adjacent to the first area is formed may be misaligned. As a result, the position of the upper edge in the first area and the position of the upper edge in the second area are misaligned. In addition, the light shielding section and the upper edge may be misaligned, in some cases, due to error in bonding the color filter 2a and the TFT substrate 3a to each other.

However, in the liquid crystal display device 1a according to the present embodiment, the difference $(W_1a-W_3a)$ occurs between the width $W_1a$ of the light shielding section 10a, and the distance $W_3a$ between the upper edges 19a and 29a. Therefore, the misalignment in position as described above can be absorbed to some degree, and the upper edges 19a and 29a can be kept inside the light shielding area of the light shielding section 10a. Thus, unlike in the conventional arts, it is possible to effectively reduce variation in image display which occurs due to light transmitted through the upper edge being outputted to display pixels.

It is to be noted that a value of the difference $(W_1a-W_3a)$ is preferably greater than or equal to 8 μm. This is because the difference $(W_1a-W_3a)$ needs to be greater than or equal to 4 μm in order to absorb misalignment in position which may be caused due to, for example, low accuracy for aligning each exposure head with the substrate, and the difference $(W_1a-W_3a)$ needs to be greater than or equal to 4 μm in order to absorb misalignment in position caused when the color filter 2a and the TFT substrate 3a are bonded to each other.

As described above, according to the first embodiment, the liquid crystal display device 1a can be realized which does not cause, even in a case where misalignment in position occurs in the joining portions of the exposure heads when the exposure process is performed by using the small mask continuous exposure method in order to produce the color filter 2a, variation in quality of display image due to the misalignment, and which is excellent in display quality.

Second Embodiment

Figure 3:
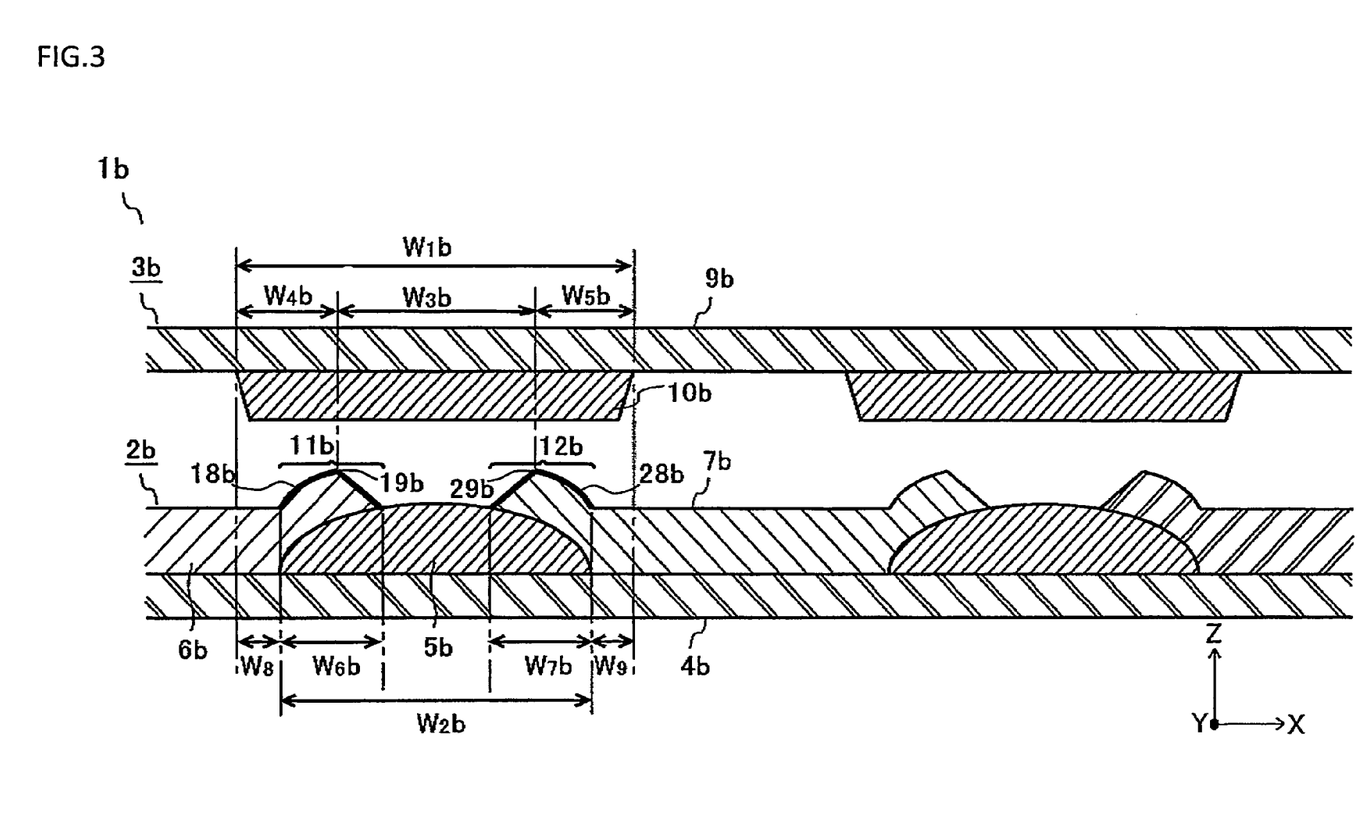
FIG. 3 is a cross-sectional view of a schematic structure of a liquid crystal display device according to a second embodiment.

FIG. 3 is a cross-sectional view of a schematic structure of a liquid crystal display device according to a second embodiment of the present invention.

A liquid crystal display device 1b according to the second embodiment is different from the liquid crystal display device according to the first embodiment in that, in the overlap portion in which the colored layer and the black matrix overlap each other, ranges shielded from light are different. Specifically, the entirety of the overlap portion is shielded from light by the light shielding section.

According to the second embodiment, a width $W_1b$ of a light shielding section 10b is determined so as to be greater than a width $W_2b$ of the black matrix 5, and overlap portions 11b and 12b are shielded from light by the light shielding section 10b. More specifically, the overlap portions 11b and 12b are positioned between lines obtained by projecting, on the substrate 4b, the edges of the light shielding section 10b in the X-axis direction. Further, a difference $(W_1b-W_2b)$ occurs between the width $W_1b$ of the light shielding section 10b and the width $W_2b$ of the black matrix 5b. Therefore, a distance $W_8$ is formed between the overlap portion 11b and the line obtained by projecting, on the substrate 4b, a corresponding one of the edges of the light shielding section 10b in the X-axis direction, and a distance $W_9$ is formed between the overlap portion 12b and the line obtained by projecting, on the substrate 4b, the other of the edges of the light shielding section 10b in the X-axis direction.

Also in the liquid crystal display device 1b having the structure as described above, overlap widths $W_6b$ and $W_7b$ of the overlap portions 11b and 12b, respectively, may deviate from predefined values due to the exposure heads being misaligned in position when the colored layers 6b and 7b are exposed to light. However, in the liquid crystal display device 1b according to the present embodiment, the entirety of each of the overlap portions 11b and 12b is positioned within a range obtained by the light shielding section 10b being projected, and the entirety thereof is shielded from light. Therefore, it is possible to avoid variation in image display caused due to light transmitted through the overlap portion 11b and light transmitted through the overlap portion 12b being outputted in different manners.

Further, the difference ($W_1b-W_2b$) occurs between the width $W_1b$ of the light shielding section 10b and the width $W_2b$ of the black matrix 5b. As a result, misalignment in position caused when the color filter 2b and the TFT substrate 3b are bonded to each other is absorbed to some degree, and the entirety of each of the overlap portions 11b and 12b can be kept inside the light shielding area of the light shielding section 10b. A value of the difference ($W_1b-W_2b$) is preferably greater than or equal to 4 μm in view of error in assembly, and is preferably not greater than 8 μm in view of reduction in aperture ratio caused due to enlargement of the light shielding section.

In the liquid crystal display device 1b according to the second embodiment, the entirety of each of the overlap portions 11b and 12b is shielded from light by the light shielding section 10b. Therefore, it is possible to not only avoid variation in image display caused due to output of light transmitted through the upper edge of a ridge, but also avoid variation in image display caused due to the widths of the overlap portions being different. As a result, it is possible to provide a liquid crystal display device which enables display quality to be improved as compared to the liquid crystal display device according to the first embodiment.

It is to be noted that, although a black matrix is used as a light shielding layer in each of the first and the second embodiments, the present invention is not limited thereto, and, for example, an electrode layer that is formed of thin metal film and formed on the substrate may be used.

EXAMPLES

Hereinafter, examples where the present invention was implemented in practice will be described.

A color filter having red, blue, and green colored layers formed on its substrate was produced by using the small mask continuous exposure method and the proximity exposure method as described above. Further, a TFT substrate was produced by light shielding sections each formed of source or gate wiring being formed on a substrate. At this time, the liquid crystal display devices were produced such that the width of the light shielding section, the width of the black matrix, and a distance between the upper edge of each ridge, and a line obtained by projecting, on the substrate, a corresponding one of the edges of the light shielding section, have values indicated in examples 1 to 3 and a comparative example described below. Variation in image display on each of the liquid crystal display devices was visually observed, and evaluation was represented as "A: no variation in display occurred, B: few variation in display occurred, or C: variation in display occurred". The result of the evaluation is indicated in table 1. It is to be noted that the width of the light shielding section, the width of the black matrix, and the distance between the upper edge of each ridge, and the corresponding one of the projected edges of the light shielding section each represents a value in the X-axis direction. In examples 1 to 3, the upper edges of the ridges were positioned in areas which were shielded from light by the light shielding section. In comparative example 1, the upper edges of the ridges were positioned in areas which were not shielded from light by the light shielding section.

Example 1

A liquid crystal display device according to example 1 had the structure shown in FIG. 3. The width ($W_1a$) of the light shielding section was 22 μm, the width ($W_2a$) of the black matrix was 16 μm, and the distances ($W_4a$ and $W_5a$) between the upper edges of the ridges, and the lines obtained by projecting, on the substrate, the edges of the light shielding section 10, respectively, were each 4 μm (the upper edges were positioned between the projected lines of the light shielding section).

Example 2

A liquid crystal display device according to example 2 had the structure shown in FIG. 1. The width ($W_1b$) of the light shielding section was 18 μm, the width ($W_2b$) of the black matrix was 28 μm, and the distances ($W_4b$ and $W_5b$) between the upper edges of the ridges, and the lines obtained by projecting, on the substrate, the edges of the light shielding section 10, respectively, were each 4 μm.

Example 3

Figure 4:
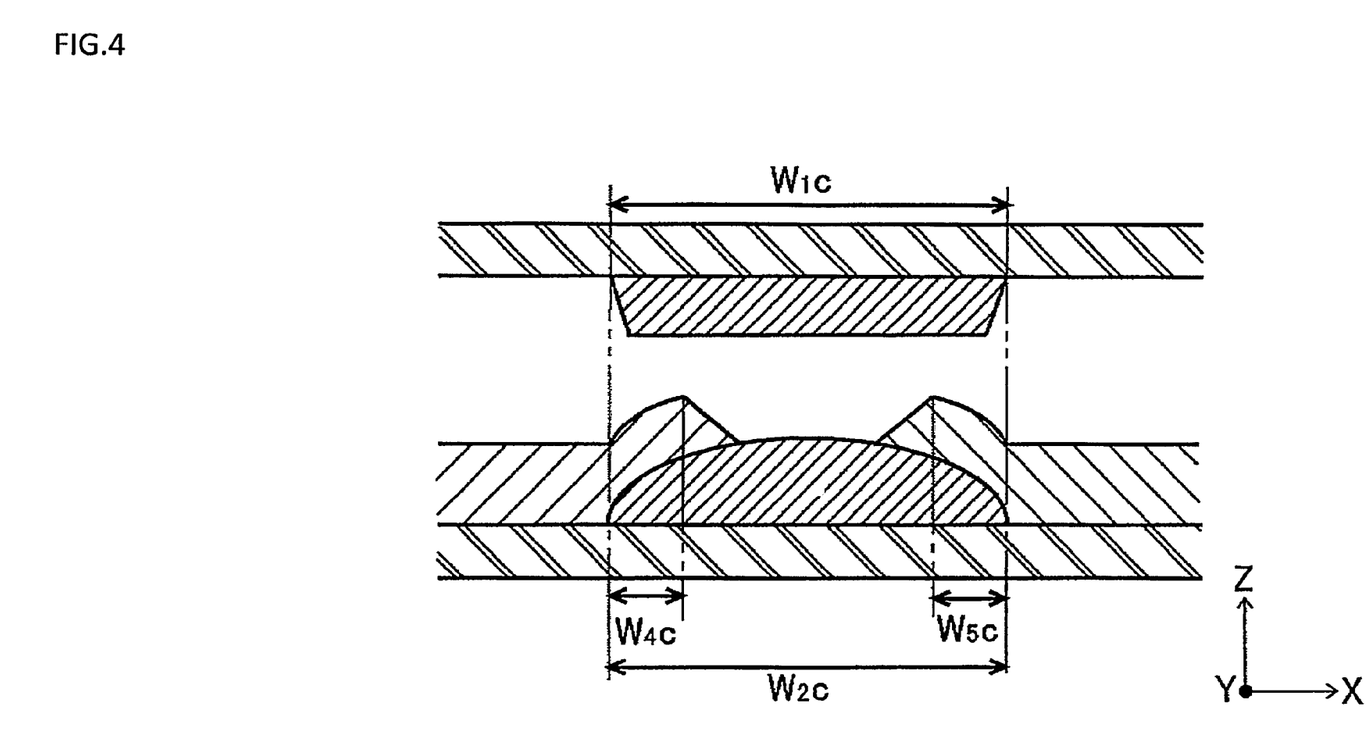
FIG. 4 is a cross-sectional view of a schematic structure of a liquid crystal display device according to example 3.

A liquid crystal display device according to example 3 had a structure shown in FIG. 4. The width ($W_1c$) of the light shielding section was 22 μm, the width ($W_2c$) of the black matrix was 22 μm, and the distances ($W_4c$ and $W_5c$) between the upper edges of the ridges, and the lines obtained by projecting, on the substrate, the edges of the light shielding section 10, respectively, were each 4 μm.

Comparative Example

Figure 5:
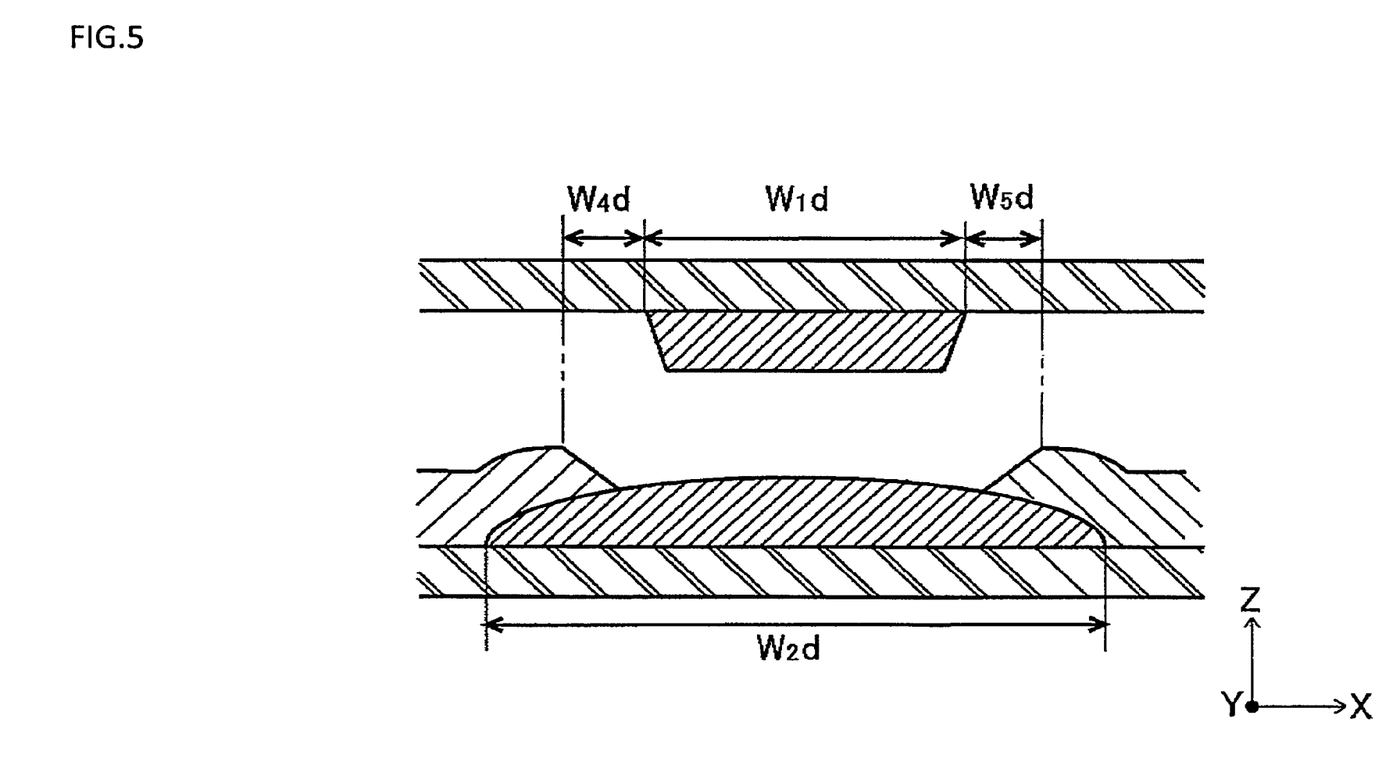
FIG. 5 is a cross-sectional view of a schematic structure of a liquid crystal display device according to comparative example.

A liquid crystal display device according to a comparative example had a structure shown in FIG. 5. The width ($W_1d$) of the light shielding section was 18 μm, the width ($W_2d$) of the black matrix was 28 μm, and the distances ($W_4d$ and $W_5d$) between the upper edges of the ridges, and the lines obtained by projecting, on the substrate, the edges of the light shielding section 10, respectively, were each −4 μm (the upper edges were not positioned between the projected lines of the light shielding section).

TABLE 1

|  | Present Invention | | | Comparative sample |
| --- | --- | --- | --- | --- |
|  | Example 1 | Example 2 | Example 3 | Comparative example |
| Width $W_{1x}$ (μm) of light shielding section | 22 | 18 | 22 | 18 |
| Width $W_{2x}$ (μm) of black matrix | 16 | 28 | 22 | 28 |
| Distances $W_{4x}$ and $W_{5x}$ (μm) between upper edges and projected edges of light shielding section, respectively | 4 | 4 | 4 | −4 |
| Display quality | A | B | B | C | x: 1 to 4 (examples 1 to 4)

According to the results indicated in Table 1, in examples 1 to 3 in which at least the upper edges of the ridges were shield from light by the light shielding section, few variation in image display occurred in the liquid crystal display devices, so that display quality of each of the liquid crystal display devices was improved. Further, in example 1 in which the entirety of the overlap portions were shielded from light, the display quality was greatly improved.

Industrial Applicability

The present invention is applicable to, for example, a liquid crystal display device including a color filter.

| Reference Signs | |
|---|---|
| 1a, 1b | liquid crystal display device |
| 2a, 2b | color filter |
| 3a, 3b | TFT substrate |
| 4a, 4b | substrate |
| 5a, 5b | black matrix |
| 6a, 6b, 7a, 7b | colored layer |
| 9a, 9b | substrate |
| 10a, 10b | light shielding section |
| 11a, 11b, 12a, 12b | overlap portion |
| 18a, 18b, 28a, 28b | ridge |
| 19a, 19b, 29a, 29b | upper edge |

The invention claimed is:

1. A liquid crystal display device having a plurality of pixels aligned in a first direction and a second direction orthogonal to the first direction, the liquid crystal display device comprising:
   a color filter having formed on a substrate light shielding layers, and a plurality of colored layers which partially overlap the light shielding layers in at least the first direction;
   a TFT substrate having a plurality of light shielding sections which are positioned so as to oppose the light shielding layers, and extend in the second direction; and
   liquid crystal sealed between the color filter and the TFT substrate, wherein
   ridges extending in the second direction are formed by the plurality of colored layers overlapping the light shielding layers in the first direction,
   at least upper edges of the ridges are shielded from light by the plurality of light shielding sections, and
   a difference between a distance between the upper edges of a pair of the ridges which are shielded from light by a corresponding one of the plurality of light shielding sections, and a width of the corresponding one of the plurality of light shielding sections in the first direction, is greater than or equal to 8 µm.

2. The liquid crystal display device according to claim 1, wherein the entirety of portions in which the plurality of colored layers overlap the light shielding layers in the first direction is included in areas shielded from light by the plurality of light shielding sections.

3. The liquid crystal display device according to claim 1, wherein a width of each of the plurality of light shielding sections in the first direction is greater than a width of a corresponding one of the light shielding layers in the first direction.

4. The liquid crystal display device according to claim 3, wherein a difference between the width of each of the plurality of light shielding sections in the first direction and the width of the corresponding one of the light shielding layers in the first direction is greater than or equal to 4 µm, and is not greater than 8 µm.

5. The liquid crystal display device according to claim 1, wherein
   the plurality of colored layers overlap the light shielding layers in the first direction by a first overlap width in a first area including a predetermined number of pixel lines, and
   the plurality of colored layers overlap the light shielding layers in the first direction by a second overlap width different from the first overlap width, in a second area which is adjacent, in the first direction, to the first area, and which includes a predetermined number of pixel lines.

6. The liquid crystal display device according to claim 1, wherein the thickness of each of the light shielding layers is reduced outward in the first direction.

* * * * *